(12) United States Patent
Swanson et al.

(10) Patent No.: US 7,316,857 B1
(45) Date of Patent: Jan. 8, 2008

(54) MINIATURE ELECTROCHEMICAL GAS GENERATOR AND POWER SOURCE

(76) Inventors: Steven T. Swanson, 4636 Esther St., San Diego, CA (US) 92115; Henri J. R. Maget, 2661 Palomino Cir., La Jolla, CA (US) 92037

( * ) Notice: Subject to any disclaimer, the term of this patent is extended or adjusted under 35 U.S.C. 154(b) by 602 days.

(21) Appl. No.: 10/878,730

(22) Filed: Jun. 28, 2004

(51) Int. Cl.
*H01M 8/02* (2006.01)
*C25B 9/00* (2006.01)

(52) U.S. Cl. .......................... 429/34; 204/271; 204/278

(58) Field of Classification Search ................... 429/30, 429/31, 33, 34, 38, 39; 204/263, 266, 271, 204/278
See application file for complete search history.

(56) References Cited

U.S. PATENT DOCUMENTS 3,475,223 A * 10/1969 Kummer et al. .......... 429/33 X
3,834,944 A * 9/1974 Dennison ................... 429/39 X
4,332,664 A * 6/1982 Noszticzius et al. ........ 204/266
4,654,137 A * 3/1987 Vaughan ................. 204/263 X

* cited by examiner

*Primary Examiner*—Stephen J. Kalafut
(74) *Attorney, Agent, or Firm*—Frank G. Morkunas

(57) ABSTRACT

A miniature, battery-like device is described for the generation of gases or as a power source or battery. The generation of carbon dioxide and hydrogen by electrochemical decomposition of an aqueous oxalic acid solution is detailed. One of the electrodes of the internally located electrochemical cell is in intimate contact with the cathode cap of the device, while the other electrode is under compression from an internal spring of variable length which is in electrical contact with the anode cap. The low-cost device is easy to fill and assemble. It can be used for the controlled release of small quantities of fluid, delivered at low flow rates for long periods of time, such as pheromones, fragrances, insecticides, pesticides. It can also be used as power source using liquid fuels such as methanol and ambient air as a source of oxygen.

22 Claims, 3 Drawing Sheets

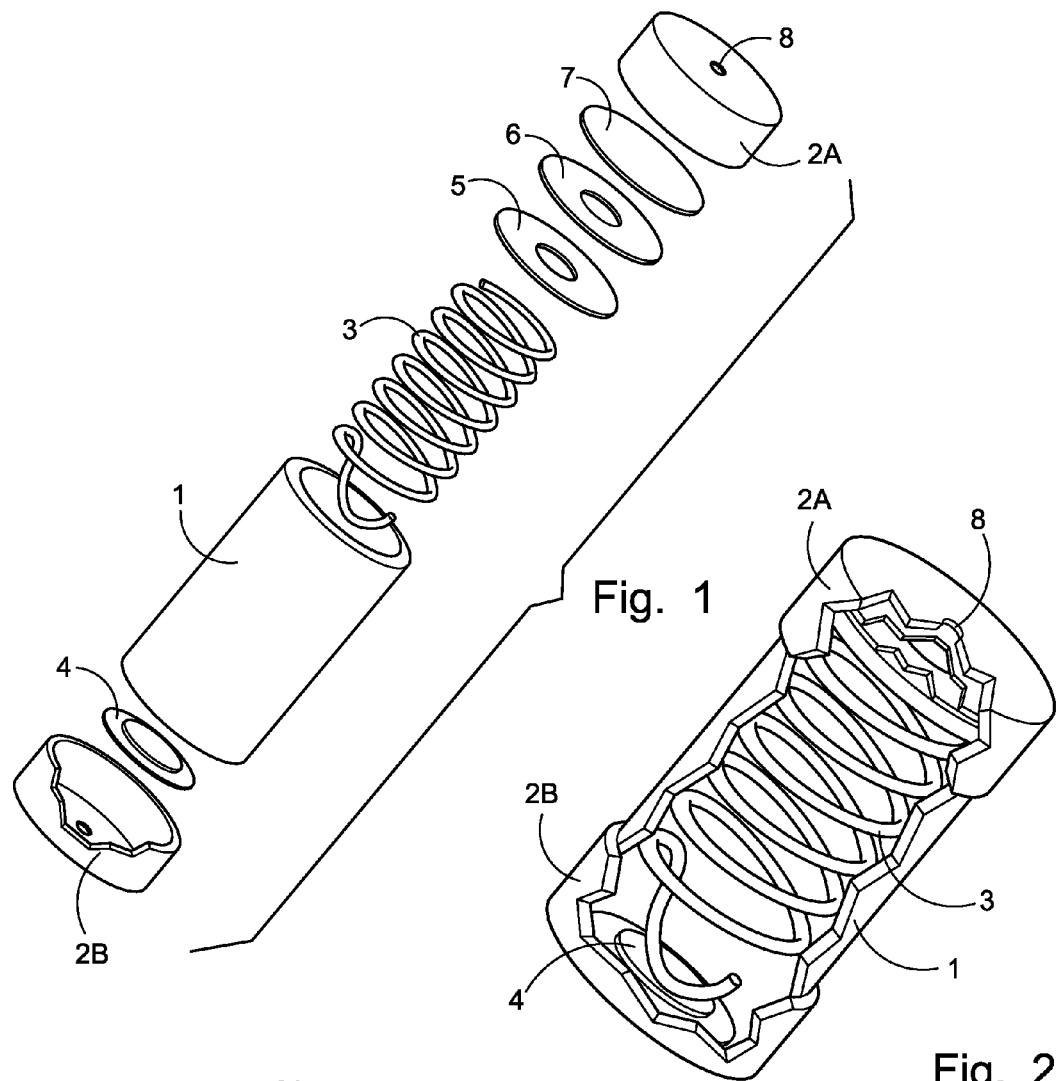
Fig. 1
Fig. 2
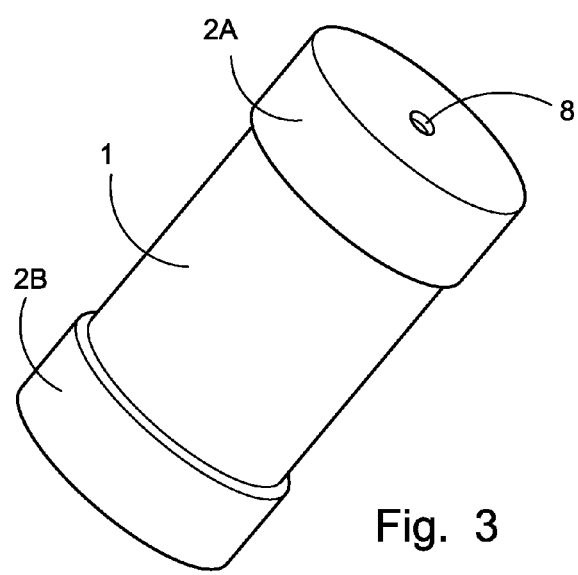
Fig. 3

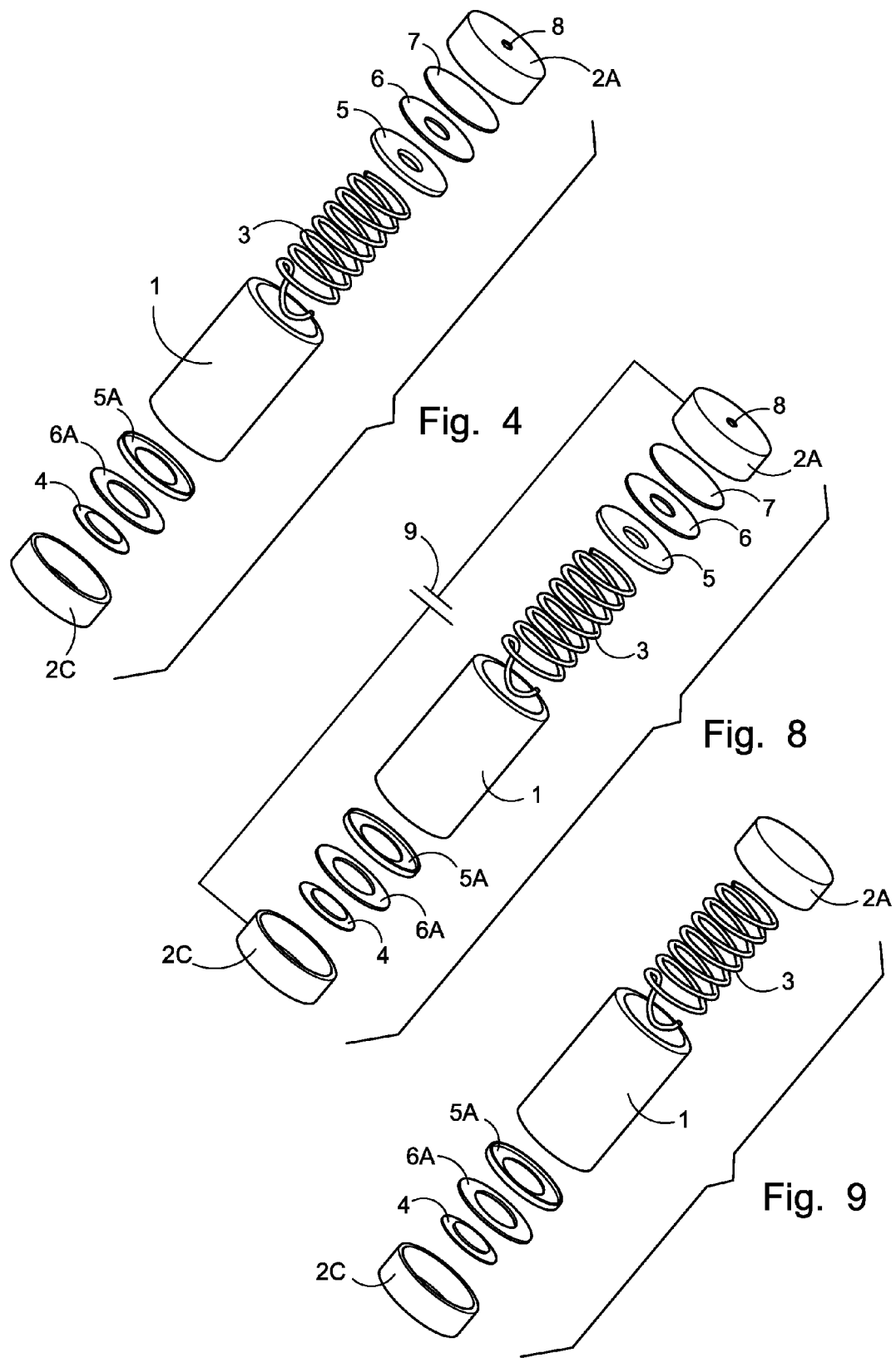

MINIATURE ELECTROCHEMICAL GAS GENERATOR AND POWER SOURCE

BACKGROUND OF THE INVENTION

The invention relates to electrochemical generated gases and more specifically to a miniature, battery-like device for generating gases or as a power source or battery.

The use of electrochemically generated gases in fluid delivery is well known. Oxygen-driven fluid delivery, with oxygen being extracted from the air, has been described by Maget in the various U.S. Pat. Nos.: 4,687,423, 4,886,514, 4,902,278, 5,928,194, 5,938,640 and 6,383,165. Hydrogen-driven fluid delivery is exemplified by the Disetronic Infuser, a disposable syringe pump, which uses a galvanic cell as a hydrogen source.

In many applications, the rate of fluid delivery is of the order of a few microliters/hour over long periods of time, such as months. In U.S. Pat. No. 6,383,165, Maget describes such a delivery system which has been shown to operate at a constant delivery rate for about 4 months.

Many of these commercial applications are price-sensitive; such is the case of the long term release of pheromones in forestry and agriculture or the delivery of fragrances in the home environment. Therefore there is a need for economical, long-life, disposable gas generators.

In U.S. Pat. No. 6,387,228, Maget describes the electrochemical generation of carbon dioxide (CO2) and hydrogen (H2), based on the decomposition of organic acids, such as formic or oxalic acid. In the current invention, the inventors describe an extremely simple means to assemble and operate a miniature electrochemical gas generator, based on the decomposition of organic acids as described in '228, which meets the criteria for economy and longevity.

Such a generator is particularly well suited for the delivery of small quantities of liquids, such as pheromones, fragrances, insecticides, pesticides , or in general chemical agents, at extremely low flow rates.

OBJECTS OF THE INVENTION

It is the primary objective of this invention to provide for a simple, practical, economical gas generator which can be controllably operated for long time periods.

It is another object of this invention to show that the assembly of the electrochemical gas generator is extremely simple and does not require unusual skills, tools or equipment.

It is a further object of this invention to show that only minor modifications of the generator are required to achieve the desired longevity.

It is also an object of this invention to provide for a structure suitable as a battery using liquid fuels and air as an oxidant.

SUMMARY OF THE INVENTION

A miniature, battery-like device is described for the generation of gases or as a power source or battery. The generation of carbon dioxide and hydrogen by electrochemical decomposition of an aqueous oxalic acid solution is detailed. One of the electrodes of the internally located electrochemical cell is in intimate contact with the cathode cap of the device, while the other electrode is under compression from an internal spring of variable length which is in electrical contact with the anode cap. The low-cost device is easy to fill and assemble. It can be used for the controlled release of small quantities of fluid, delivered at low flow rates for long periods of time, such as pheromones, fragrances, insecticides, pesticides. It can also be used as power source using liquid fuels such as methanol and ambient air as a source of oxygen.

In the first embodiment, the electrochemical gas generator would be connected to a battery and current control circuit such as illustrated in FIG. 3 of the '228 U.S. patent. The gas generator would also be placed in a container containing liquid to be distributed. This container would have a liquid release port and the pressure of the gases released from the gas generator would periodically force small drops of the liquid out through the release port.

The second embodiment would function in a similar manner, but would release the hydrogen gases out of its anode cap.

The third embodiment, structurally identical to the second embodiment, would allow the H2 gas to react with oxygen (from air) to produce water. Whenever a methanol solution is used in the gas generator, the generator becomes energy-independent and operates simultaneously as a power source and as a CO2 generator.

In the fourth embodiment the electrochemical reaction does not produce CO2 and therefore obviates the need for an anode exit port, while air is allowed to access the cathode exit port, thereby creating a power generating fuel cell.

DESCRIPTION OF THE DRAWINGS

FIG. 1 is a schematic exploded front perspective view of the electrochemical gas generator;

FIG. 2 is a schematic front perspective view illustrating the internal assembly of the electrochemical gas generator;

FIG. 3 is a schematic front perspective view of the assembled electrochemical gas generator;

FIG. 4 is a schematic exploded front perspective view of a first alternate embodiment of the electrochemical generator designed as a gas source for the separate release of $CO_2$ and $H_2$ or as a power source releasing $CO_2$;

FIG. 8 is a schematic exploded front perspective view of the first alternative embodiment including an external battery used to operate the gas generator; and FIG. 9 is a schematic exploded front perspective view of a second alternative embodiment that functions as a miniature fuel cell which employs a fuel which does not generate gaseous by-products and the oxygen from air as an oxidant.

DESCRIPTION OF THE PREFERRED EMBODIMENT

Figure 5:
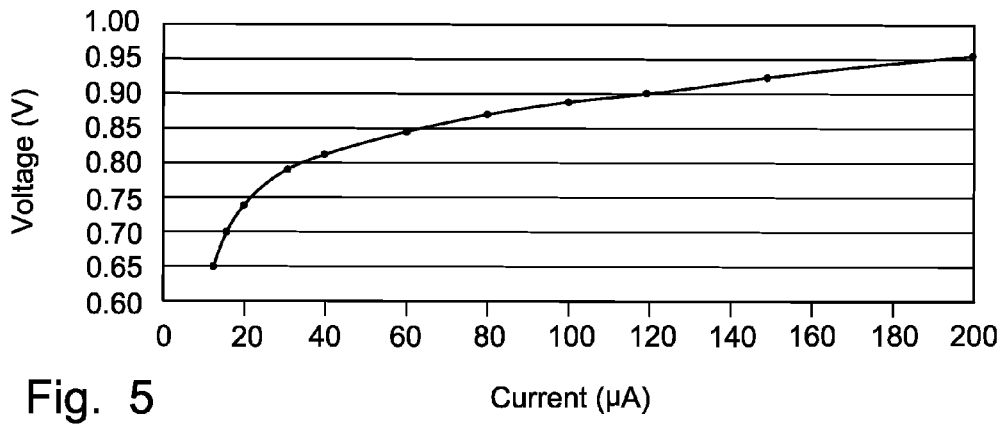
FIG. 5 presents the experimental results of the relationship between current and voltage of the generator while operating at low currents.

The preferred embodiment consists of a container 1 enclosed by top and bottom caps 2A and 2B. Within container 1 is located spring 3 which is under compression and retained by caps 2A and 2B. One cap, 2B holds electrochemical cell 4. The other cap 2A holds gas permeable membrane 7, a seal 6 and a retaining ring 5. Cap 2A is only distinguished from cap 2B in that it has a gas release port 8. Oxalic acid 12 is shown in container 1.

Container 1 is a plastic tube, made from a polyolefin (polypropylene or polyethylene). As a matter of illustration the plastic tube has a diameter of 10 mm. Its length is variable according to the expected longevity of the gas generator. Caps 2A and 2B are made of stainless steel, the gas port in cap 2A has a diameter of about 0.5 mm. Electrochemical cell 4 consists of an ionomer capable of transporting hydrogen ions and of two electrodes. The ionomer can be Nafion, a registered trademark of DuPont Corp. The electrodes are noble metal blacks or activated carbons, as used in fuel cells. The electrochemical cell is surrounded by the oxalic acid solution, and therefore does not require seals or a specific geometry, and the generator's terminals can be either connected to the positive or negative terminals of the battery. For example, the cell could be located away from cap 2A, provided that electric contact exists between the electrochemical cell anode and cap 2A, as would be provided by another contact spring. Retainer ring 5 is made of stainless steel. Seal 6 is an elastomer, such as a nitrile rubber. Membrane 7 is permeable to the released gases, as available from W. L. Gore Corporation.

The purposes of these components are as follows:

One of the electrode of cell 4 is in intimate contact with cap 2B. In this instance it forms the cathode of the electrochemical generator. Membrane 7 is permeable to gases, but not to liquid; therefore acting as a barrier to prevent fluid loss from the container. Seal 6 is provided for the purpose of preventing liquid to seep around membrane 7. Retainer ring 5 is used to compress seal 6 and membrane 7 against cap 2A, while also establishing electrical contact between spring 3 and cap 2A. In this instance spring 3 establishes contact between one electrode of cell 4 and cap 2A, thereby becoming the anode of the generator. Finally, the oxalic acid necessary to produce the gas is located, as a solution within container 1.

Once assembled, as illustrated in FIG. 2, the spring applies pressure against the electrochemical cell, insuring contact with the cathode cap, while also establishing contact with electrochemical cell anode and anode cap 2A.

FIG. 3 shows the completed assembled generator. As an illustration it has a diameter D1 of 10 mm and a variable length L1. For example, a 10 mm diameter generator with a length of 20 mm can hold approximately 1.5mL of a 10 wt% aqueous oxalic acid solution, or about 150 mg of oxalic acid, which can release approximately 120 cc of gas. In many applications the expected generation rate is less than 0.3 cc/day ; therefore such a generator could operate for 400 days. The length of container 1 can be reduced or increased, according to the needs of the application without the need for other dimensional changes. This is a feature of obvious interest to the manufacturer and the end-users. Further container volume reduction, or increased operating durations, can be achieved by using supersaturated mixtures of oxalic acid and water, containing more than 10 wt% of oxalic acid.

The assembly of the generator is simple, consisting of the following steps:
- the plastic sleeve 1 is press-fitted into cap 2B or the cap is crimped onto the sleeve;
- electrochemical cell 4 is placed within cathode cap 2B;
- container 1 is filled with the appropriate amount of oxalic acid solution;
- spring 3 is inserted into container 1;
- in a separate operation, membrane 7 is inserted into anode cap 2A, followed by seal 6 and retainer ring 5, hereby completing the anode cap sub-assembly; and
- the sub-assembly is then press-fitted onto sleeve 1.

The assembly process does not require complex tools or equipment and is readily amenable to automation.

When a current, or voltage, is applied to the anode and cathode caps, the following reactions take place:

Anode reaction: $(COOH)_2 \rightarrow CO_2 + 2H^+ + 2e^-$

Cathode reaction: $2H^+ + 2e^- \rightarrow H_2$

Hydrogen evolves at the anode cap and is released from the oxalic acid solution through vent 8. Carbon dioxide is released from the anodic surface of the electrochemical cell, bubbles through the solution and escapes via vent 8. The generator is extremely efficient since 1.5 moles of gas are released for each electron, as compared to 0.5 mole of gas per electron for the hydrogen gas cell, 0.25 mole of gas per electron for the air-to-oxygen cell and 0.75 mole of gas per electron for the water electrolysis cell.

If H2 is an undesirable by-product, the assembly illustrated in FIG. 1 can be modified to prevent mixing of CO2 and H2, by providing a release port for H2 at the cathode. FIG. 4 illustrates such an assembly where a cathode seal 6A is pressed against electrochemical cell 4 by means of a retainer ring 5A. In this arrangement, H2 is prevented from bubbling through the oxalic acid solution, but allowed to be released through port 8A provided for in cathode cap 2C. In this instance, an external power source, battery 9 of FIG. 8, is required to operate the gas generator. The second embodiment of FIG. 4 can also be used as a fuel cell power source or battery, where cap 2C now serves as an oxygen cathode, while container 1 holds a fuel and cap 2A becomes the fuel electrode or anode, In this instance, the following reactions will take place:

Air cathode reaction: $O_2(\text{from air}) + 2H^+ + 2e^- \rightarrow H_2O$

Fuel anode: $\text{Fuel} \rightarrow H^+ + e^-$

The fuels for the anodic reactions are generally inorganic compounds, such as metal hydrides, and organic compounds such as alcohols, ketones or acids. Carbonaceous fuels, such as methanol or oxalic acid, would require the presence of exit port 8, since the reaction by-products would include volatile CO2. Non-carbonaceous fuels, such as sodium borohydride would not require an exit port since only solid by-products, such as sodium borate, are generated.

In either of these examples, the energy released by the over-all electrochemical process is sufficient to sustain the process. In the case of methanol, the anode reaction is: $CH_3OH + H_2O \rightarrow CO_2 + 6H^+ + 6e^-$ and the cathode reaction is: $6H^+ + 6e^- + 1.5O_2 \rightarrow 3H_2O$ for an over-all reaction of: $CH_3OH + H_2O + 1.5O_2 \rightarrow CO_2 + 3H_2O$ which releases energy and CO2 gas. In this instance the auxiliary power source (battery) is not required. In conventional batteries, fuels and oxidants are solids capable of transferring electrons, or their electric conductivity is enhanced by grid structures or other materials to reduce internal resistance between the fuel, or oxidant and the current collectors. These batteries are not suitable for liquid fuels, such as methanol. By providing electric contacts by means of metal springs between the cell anode and metal cap 2A of the structure of FIG. 4, it is now possible to use liquid fuels in a structural embodiment similar to that of a battery.

When carbonaceous compounds are used, port 8 of FIG. 4 is used to evacuate CO2, whereas the gas port of bottom cap 2c is used as an air intake port to allow the cathodic oxidation process, requiring oxygen from air, to take place. In this instance the energetic balance is such that electric power is generated simultaneously with gas generation. The CO2 generator does not require a battery, since it generates its own energy. Since cathode and anode materials are not consumed, the generator is a fuel cell, producing CO2 as a by-product.

When non-carbonaceous fuels, such as sodium borohydride, are used, port 8 is not required since CO2 is not being generated. FIG. 9 illustrates a simplified structure with an air intake port in bottom cap 2C. Bottom cap 2C becomes the air cathode of the fuel cell which in this instance generated electrochemical energy without producing gaseous by-products. FIG. 9 is a means to illustrate that the slightly modified structure can be used as a fuel cell.

FIG. 5 shows the experimental correlation between voltage and current for a gas generator of FIG. 1 holding a 0.06 $cm^2$ cell and decomposing an aqueous oxalic acid solution.

The operating cell voltage is below 1.0 volt for a current of up to 250 microamps or the equivalent of a current density of 4 milliamps/$cm^2$. This low voltage is important since it allows the generator to operate from single batteries.

For high current densities, the internal resistance of the generator can be reduced by improving the contact between spring 3 and electrochemical cell 4 by intercalating a metal screen between spring 3 and cell 4.

EXAMPLE I

Figure 6:
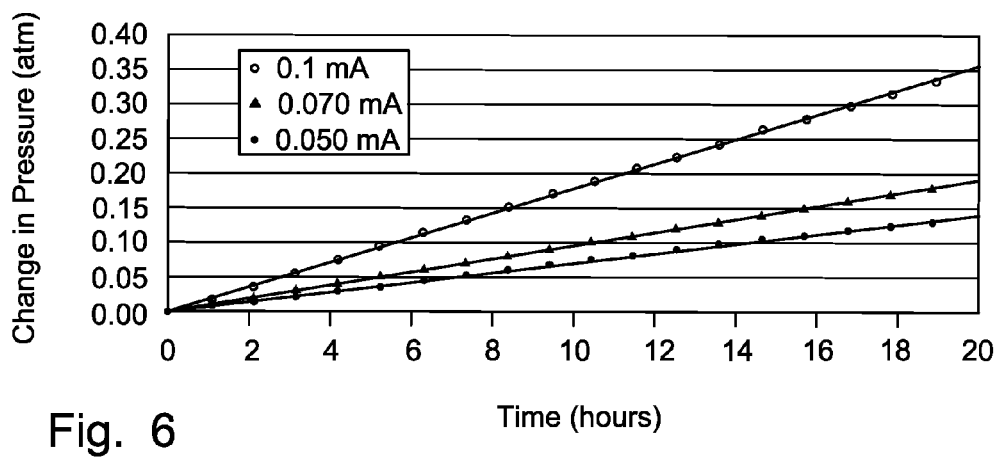
FIG. 6 shows the pressure generated by the same generator under current control at three different currents.

A generator, as illustrated in FIG. 1, is operated by means of a current controller described in FIG. 3 of U.S. Pat. No. 6,387,228 B1 and this current controller is incorporated in this patent application by reference. The generator is enclosed within a sealed container fitted with a pressure sensor. The pressure change is monitored as a function of time for three different currents, namely 50, 70 and 100 microamps. The observed pressure increases as a function of time and is proportional to the applied current, as illustrated in FIG. 6.

EXAMPLE II

Figure 7:
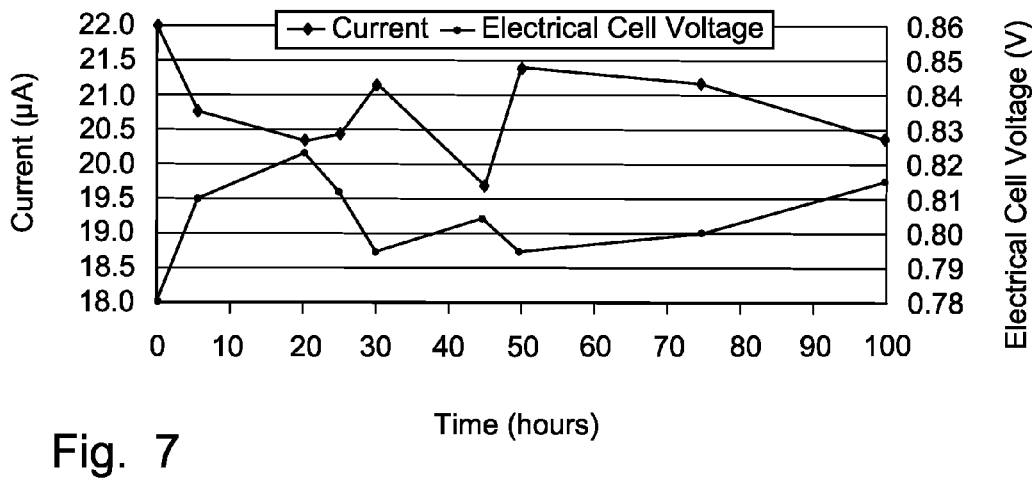
FIG. 7 shows the stability of the generator voltage operating without current controller.

A generator, as illustrated in FIG. 1, is equipped with a 0.06 $cm^2$ electrochemical cell and operated from a DC voltage of 1.43 volts applied directly to the terminals of the generator via a 30 kilo-ohm resistor. No other current or voltage regulation means are used. Current through the generator and generator voltage are monitored as a function of time. FIG. 7 illustrates the experimental results. In this instance the average electrochemical cell voltage over the test period is 0.80 volts with a maximum variance of +/−20 millivolts. This experiment suggests that current stability is achievable within 4% of the average value of 20.9 microamp, without controller, a result suggesting that for most applications no additional regulation is required.

For an application requiring a current of 20 microamps, a battery capacity of 14.4 mahr would be needed per month of operation. Since small commercial silver oxide batteries have a capacity of up to 120 mAhr, it is apparent that such a battery could operate the generator for at least six months, and that the container volume of 1.5 mL would be adequate to sustain such operation.

It should be apparent that various modifications of the described components and structures could be incorporated without affecting the spirit of the invention. Examples of such modifications are:

caps 2A and/or 2C to include "nipples" for the gas exit ports;
spring geometries other than cylindrical, namely conical shapes;
reversing the battery polarity at the generator caps, thereby forcing the release of gases to occur at different electrodes, while still exiting from the same port.
Using various oxalic acid concentration, including supersaturated solutions
Mixing oxalic acid with gelling agents to form solid gels.

The invention claimed is:

1. A miniature electrochemical gas generator comprising:
an elongated plastic tube member having non-electrical conducting properties; said plastic tube member having a top end, a bottom end, an interior chamber, an outer diameter D1, an inner diameter D2 and a length L1;
a top end cap having a first tubular sleeve closed by a top end wall; said first tubular sleeve having an inner surface and an inner diameter D3; said top end cap being made of metal and having electrical conducting properties; wherein said top end cap functions as a current collector; a gas release port being formed in said top end wall for releasing gases;
a bottom end cap having a second tubular sleeve closed by a bottom end wall; said second tubular sleeve having an inner diameter D3; said bottom end cap being made of metal and having electrical conducting properties; wherein said bottom end cap functions as a current collector;
an electrochemical cell module having a first electrode and a second electrode; said electrochemical cell module being positioned within said bottom end cap with said first electrode being in electrical contact with said bottom end cap;
a gas permeable membrane having a bottom surface and an outer diameter substantially equal to D3 that seals said gas permeable membrane against the inner surface of said first tubular sleeve of said top end cap and wherein said gas permeable membrane is positioned in said top end cap adjacent to said top end wall;
a metallic retaining ring having a central aperture; said metallic retaining ring having a top surface, a bottom surface and an outer diameter substantially equal to D3 and wherein said metallic retaining ring is positioned in said top end cap adjacent to said gas permeable membrane; said metallic retaining ring being in electrical contact with said top end cap;
an elongated metal wire having a top end and a bottom end; said metal wire being positioned within said plastic tube member with said top end being in electrical contact with said top end cap and said bottom end being in electrical contact with said second electrode of said electrochemical cell module; and
a predetermined amount of carboxylic acid solution in said interior chamber of said plastic tube member.

2. A gas generator as recited in claim 1 wherein D1 is less than 25 mm.

3. A gas generator as recited in claim 1 wherein L1 is less than 50 mm.

4. A gas generator as recited in claim 1 wherein said elongated metal wire is a coiled spring.

5. A gas generator as recited in claim 1 wherein said gas permeable membrane has properties that prevents said carboxylic solution from passing upwardly through and out through said gas release port in said top end cap.

6. A gas generator as recited in claim 1 wherein the carboxylic acid is oxalic acid.

7. A gas generator as recited in claim 1 wherein the carboxylic acid is formic acid.

8. A gas generator as recited in claim 1 further comprising a battery having a positive terminal and a negative terminal; said positive terminal being electrically connected to one said end cap and said negative terminal being electrically connected to the other said end cap.

9. A miniature electrochemical gas generator comprising:
an elongated plastic tube member having non-electrical conducting properties; said plastic tube member having a top end, a bottom end, an interior chamber, an outer diameter D1, an inner diameter D2 and a length L1;

a top end cap having a first tubular sleeve closed by a top end wall; said first tubular sleeve having an inner diameter D3; said top end cap being made of metal and having electrical conducting properties; wherein said top end cap functions as an anode member; a gas release port being formed in said top end wall for releasing carbon dioxide gas;

a bottom end cap having a second tubular sleeve closed by a bottom end wall; said tubular sleeve having an inner diameter D3; said bottom end cap being made of metal and having electrical conducting properties; wherein said bottom end cap functions as a cathode member;

an electrochemical cell having a cathode and an anode; said electrochemical cell being positioned within said bottom end cap with said cathode being in electrical contact with said bottom end cap; a gas release port being formed in said bottom end wall for releasing hydrogen gas;

a seal having an outer diameter substantially equal to D1 and having an aperture therein; said seal being in contact with said electrochemical cell;

a first metallic retaining ring having a central aperture; said first metallic retaining ring having a top surface, a bottom surface and an outer diameter substantially equal to D3 and wherein said first metallic retaining ring is positioned in said bottom end cap in contact with said seal;

a gas permeable membrane having a bottom surface and an outer diameter substantially equal to D3 and wherein said gas permeable membrane is positioned in said top end cap adjacent to said top end wall;

a second metallic retaining ring having a central aperture; said second metallic retaining ring having a top surface, a bottom surface and an outer diameter substantially equal to D3 and wherein said second metallic retaining ring is positioned in said top end cap in contact with said gas permeable membrane and in electrical contact with said first tubular sleeve of said top end cap;

an elongated metal wire having a top end and a bottom end; said metal wire being positioned within said plastic tube member with said top end being in electrical contact with said top end cap and said bottom end being in electrical contact with said cathode of said electrochemical cell module; and a predetermined amount of carbonaceous fuel solution in said interior chamber of said plastic tube member.

10. A gas generator as recited in claim 9 wherein D1 is less than 25 mm.

11. A gas generator as recited in claim 9 wherein L1 is less than 50 mm.

12. A gas generator as recited in claim 9 wherein said elongated metal wire is a coiled spring.

13. A gas generator as recited in claim 9 wherein said gas permeable membrane has properties that prevents said carbonaceous fuel solution from passing upwardly through said gas permeable membrane and out through said gas release port in said top end cap.

14. A gas generator as recited in claim 9 further comprising a battery having a positive terminal and a negative terminal; said positive terminal being electrically connected to said top end cap and said negative terminal being electrically connected to said bottom end cap.

15. A gas generator as recited in claim 9 wherein the carbonaceous fuel is oxalic acid.

16. A gas generator as recited in claim 9 wherein the carbonaceous fuel is formic acid.

17. A gas generator as recited in claim 9 wherein the carbonaceous fuel is methanol.

18. A miniature fuel cell comprising:

an elongated plastic tube member having non-electrical conducting properties; said plastic tube member having a top end, a bottom end, an interior chamber, an outer diameter D1, an inner diameter D2 and a length L1;

a top end cap having a first tubular sleeve closed by a top end wall; said first tubular sleeve having an inner diameter D3; said top end cap being made of metal and having electrical conducting properties; wherein said top end cap functions as an anode member;

a bottom end cap having a second tubular sleeve closed by a bottom end wall; said second tubular sleeve having an inner diameter D3; said bottom end cap being made of metal and having electrical conducting properties; wherein said bottom end cap functions as a cathode member;

an electrochemical cell having a cathode and an anode; said electrochemical cell being positioned within said bottom end cap with said cathode being in electrical contact with said bottom end cap; wherein a gas inlet port is formed in said bottom end wall for allowing air to contact said cathode;

a seal having an outer diameter substantially equal to D1 and having an aperture therein; said seal being in contact with said electrochemical cell;

a metallic retaining ring having a central aperture; said metallic retaining ring having a top surface, a bottom surface and an outer diameter substantially equal to D3 and wherein said metallic retaining ring is positioned in said bottom end cap in contact with said seal;

an elongated metal wire having a top end and a bottom end; said top end being in electrical contact with said top end cap and said bottom end being in electrical contact with said anode of said electrochemical cell; and a predetermined amount of metal hydride solution in said interior chamber of said plastic tube member.

19. A fuel cell as recited in claim 18 wherein D1 is less than 25 mm.

20. A fuel cell as recited in claim 18 wherein L1 is less than 50 mm.

21. A fuel cell as recited in claim 18 wherein said elongated metal wire is a coiled spring.

22. A fuel cell as recited in claim 18 wherein said metal hydride is sodium borohydride.

* * * * *